No. 682,506.  
O. SWANSTROM.  
HORSESHOE.  
(Application filed Mar. 11, 1901.)  
Patented Sept. 10, 1901.

(No Model.)

Witnesses  
Inventor  
Otto Swanstrom,  
By H. B. Willson & Co.  
Attorneys

UNITED STATES PATENT OFFICE.

OTTO SWANSTROM, OF FRAZEE, MINNESOTA.

HORSESHOE.

SPECIFICATION forming part of Letters Patent No. 682,506, dated September 10, 1901.

Application filed March 11, 1901. Serial No. 50,673. (No model.)

*To all whom it may concern:*

Be it known that I, OTTO SWANSTROM, a citizen of the United States, residing at Frazee, in the county of Becker and State of Minnesota, have invented certain new and useful Improvements in Horseshoes; and I do declare the following to be a full, clear, and exact description of the invention, such as will enable others skilled in the art to which it appertains to make and use the same.

The invention relates to horseshoes.

The object of the invention is to provide a removable calk for a horseshoe which may be readily adjusted to position and which will be securely retained without the employment of foreign fastening means or without screw-threading, fastening means being objectionable for the reason of the expense attached thereto and screw-threading being objectionable for the reason that when the calks are tightened it is difficult to get their edges or working faces into the proper position.

A further object of the invention is to slant the toe-calks, so that the animal will obtain a firmer hold upon the ice than if the said calks were perfectly straight vertically.

With these and other objects in view the invention consists of certain novel features of construction, combination, and arrangement of parts, which will be hereinafter more fully described, and particularly pointed out in the appended claim.

Figure 1:
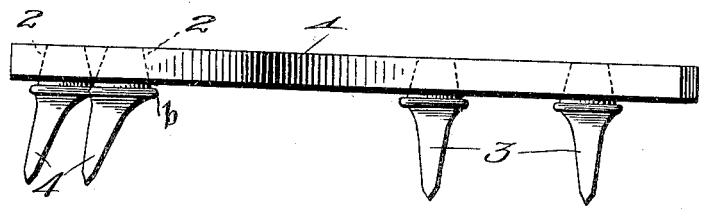
Figure 2:
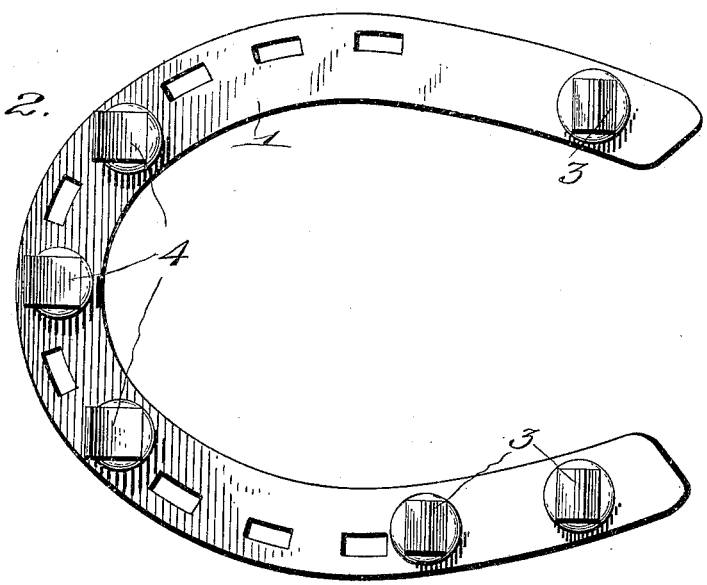
Figure 3:
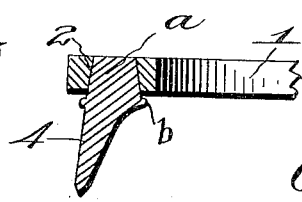

In the accompanying drawings, Figure 1 is a side elevation of my improved horseshoe. Fig. 2 is a bottom plan view, and Fig. 3 is a vertical sectional view through the toe of the shoe and one of the toe-calks.

In the drawings, 1 denotes a horseshoe, which may be of any well known or approved construction, provided with openings which are made inclined and tapering from the base upward to form sockets 2.

3 denotes the heel-calks, and 4 denotes the toe-calks. Each of these calks has a long straight sharp lower end or working edge, so that it will make a deep chisel-like cut in the ice and will always give the necessary amount of surface to hold, whether the ice is hard or soft. The edge is not limited to any certain size, but it is preferred for the above reason to make it chisel-shaped. The toe-calks slant forwardly or are inclined from rear to front, as shown, which enables the animal to get a better hold on the ice, for it is well known that in pulling the animal raises his heels up and pulls only with the toe. By inclining the calks from rear to front it will be impossible for the calks to slip, whereas if a calk with a vertical front wall is used under the same conditions—that is, when the animal begins to pull with his toe—the said calk will slant so far rearwardly as to cause it to slip. These calks are secured in the inclined tapering sockets 2 of the shoe in the following manner: I make the shank $a$ of the calk inclined and tapering, so as to correspond exactly with the inclined tapering socket-seat 2. At the union of the calk and its shank I form a surrounding projecting ring $b$, (shown in Fig. 3,) which serves when the shank is inserted in the socket to wedge the same therein by means of using a suitable implement, such as a hammer or the like, to strike the shoulder, thus driving the shank into the socket, whereby it is held without the aid of an intermediate fastening device, as the wedging action between socket and shank serves to keep the calk in its seat or socket by the coacting frictional engagement of said shanks and sockets. Furthermore, by means of the annular shoulder $b$, if occasion requires it, the shank can be driven into the socket by means hereinbefore stated, the shank $a$ of the calk, tapering in form, corresponding to the tapering of the calk sockets or apertures in the shoe. By this construction the weight of the animal upon the shoe serves to force the calk home in its socket or seat. The calks may be readily adjusted axially by means of the annular shoulder, so as to bring all their working faces parallel, a difficult thing to do if the shanks were screw-threaded, for the reason that if screw-threaded some calks when screwed home as far as possible would have their working edges or ends at an angle to the working edges or ends of other calks.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages of the same.

Having thus described my invention, what I claim, and desire to secure by Letters Patent, is—

As an improved article of manufacture, a horseshoe having inclined socket-seats therein, tapering from the base upward, the calks having front and rear inclined face portions, and chisel-shaped terminal lower portions, the calks provided with shanks having inclined and tapering portions to correspond to the shapes of the socket-seats of the shoe, and the surrounding projecting rings formed at the union of the calks and shanks whereby frictional engagement of the shanks with the socket-seats of said shoe is accomplished, substantially in the manner described.

In testimony whereof I have hereunto set my hand in presence of two subscribing witnesses.

OTTO SWANSTROM.

Witnesses:
RAY W. JONES,
CHAS. J. BROWN.